US010556306B2

(12) United States Patent
Akiyama et al.

(10) Patent No.: US 10,556,306 B2
(45) Date of Patent: Feb. 11, 2020

(54) ROBOT SYSTEM

(71) Applicant: FANUC CORPORATION, Yamanashi (JP)

(72) Inventors: Kazuhiko Akiyama, Yamanashi (JP); Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 15/688,969

(22) Filed: Aug. 29, 2017

(65) Prior Publication Data

US 2018/0065217 A1 Mar. 8, 2018

(30) Foreign Application Priority Data

Sep. 8, 2016 (JP) .................................. 2016-175248

(51) Int. Cl.
*B25J 9/00* (2006.01)
*B23P 21/00* (2006.01)
*B25J 15/04* (2006.01)
*B25J 9/10* (2006.01)
*B23Q 3/157* (2006.01)

(52) U.S. Cl.
CPC .......... *B23P 21/008* (2013.01); *B25J 9/0009* (2013.01); *B25J 9/0084* (2013.01); *B25J 9/0093* (2013.01); *B25J 9/0096* (2013.01); *B25J 9/10* (2013.01); *B25J 15/0491* (2013.01); *B23P 21/004* (2013.01); *B23Q 3/15773* (2013.01)

(58) Field of Classification Search
CPC ........ B25J 9/0084; B25J 15/0491; B25J 9/10; B25J 9/0009; B25J 9/0093; B25J 9/0096; B23Q 37/00; B23P 21/008; B23P 21/004
See application file for complete search history.

(56) References Cited

U.S. PATENT DOCUMENTS

| 4,611,749 | A | * | 9/1986 | Kawano | ............... B23K 37/047 228/176 |
| 6,247,999 | B1 | * | 6/2001 | Tokiwa | ................... B24B 19/20 451/57 |
| 6,256,868 | B1 | | 7/2001 | Sugito et al. | |

(Continued)

FOREIGN PATENT DOCUMENTS

| CN | 101437648 A | 5/2009 |
| CN | 103659811 A | 3/2014 |

(Continued)

OTHER PUBLICATIONS

Japanese Decision to Grant a Patent dated Oct. 2, 2018, in connection with corresponding JP Application No. 2016-175248 (6 pgs., including English translation).

(Continued)

*Primary Examiner* — Stephen Holwerda
(74) *Attorney, Agent, or Firm* — Maier & Maier, PLLC (57) ABSTRACT

A robot system including a plurality of robots that are arranged at intervals and that each perform machining on a work; and a tool storage unit that stores a tool used when each of the robots performs machining on the work and that is disposed at a position allowing at least one of the robot to take out the tool, wherein the respective robots are provided with hands with which the tool stored in the tool storage unit can be handled; and, when one of the robots needs to exchange the tool.

6 Claims, 7 Drawing Sheets

(56) References Cited

U.S. PATENT DOCUMENTS

| | | | |
|---|---|---|---|
| 6,415,204 B1 | 7/2002 | Hirabayashi et al. | |
| 2002/0039183 A1* | 4/2002 | Yagita | G01N 21/9027 356/240.1 |
| 2005/0095091 A1 | 5/2005 | Fukada | |
| 2005/0224557 A1* | 10/2005 | Kraus | B23K 37/047 228/49.2 |
| 2009/0126178 A1* | 5/2009 | Kipping | B23K 37/047 29/283 |
| 2011/0280691 A1* | 11/2011 | Yabe | B25J 9/0084 414/222.01 |
| 2014/0074288 A1 | 3/2014 | Satou | |
| 2014/0277715 A1* | 9/2014 | Nagai | B25J 9/0084 700/248 |
| 2016/0151913 A1 | 6/2016 | Nagatsuka | |
| 2016/0221196 A1 | 8/2016 | Suzuki | |

FOREIGN PATENT DOCUMENTS

| | | |
|---|---|---|
| CN | 104044143 A | 9/2014 |
| CN | 105643622 A | 6/2016 |
| DE | 102006020924 B4 | 3/2009 |
| EP | 1524069 A2 | 4/2005 |
| EP | 2783807 A2 | 10/2014 |
| GB | 2 336 693 A | 10/1999 |
| JP | S58-202791 A | 11/1983 |
| JP | H05-15979 A | 1/1993 |
| JP | H06-277888 A | 10/1994 |
| JP | H07-7077 Y2 | 2/1995 |
| JP | 11-277348 A | 10/1999 |
| JP | 2000-5952 A | 1/2000 |
| JP | 2000-354919 A | 12/2000 |
| JP | 2002-370128 A | 12/2002 |
| JP | 2005-118930 A | 5/2005 |
| JP | 2006-111399 A | 4/2006 |
| JP | 2014-148003 A | 8/2014 |
| JP | 2016-144863 A | 8/2016 |
| WO | 2015075775 A1 | 5/2015 |

OTHER PUBLICATIONS

Japanese Search Report dated Sep. 13, 2018, in connection with corresponding JP Application No. 2016-175248 (11 pgs., including English translation).

Office Action dated Apr. 8, 2019, in corresponding German Application No. 10 2017 120 116.5 including English-language translation; 8 pages.

* cited by examiner

ROBOT SYSTEM

CROSS-REFERENCE TO RELATED APPLICATIONS

This application is based on Japanese Patent Application No. 2016-175248, the contents of which are incorporated herein by reference.

TECHNICAL FIELD

The present invention relates to a robot system.

BACKGROUND ART

In a parts machining line in which a plurality of robots are arranged, when the type of a work machined by each of the robots is changed, it is necessary to exchange a positioning jig that is prepared for each type of work; thus, there are known conventional robot systems in which, storage units that store jigs are provided at both sides of the machining line, and a carriage on which a jig taken out from one of the storage units is placed is made to circulate in one direction (for example, see PTL 1).

CITATION LIST

Patent Literature

{PTL 1} Japanese Unexamined Patent Application, Publication No. Hei 05-15979

SUMMARY OF INVENTION

Solution to Problem

According to one aspect, the present invention provides a robot system including: a plurality of robots that are arranged at intervals and that each perform machining on a work; and a tool storage unit that stores a tool used when each of the robots performs machining on the work and that is disposed at a position allowing at least one of the robots to take out the tool, wherein the respective robots are provided with hands with which the tool stored in the tool storage unit can be handled; and, when one of the robots needs to exchange the tool, all of the other robots that are disposed between the robot that needs to exchange the tool and the tool storage unit pass the tool between the adjacent robots with the hands and convey the tool to the robot that needs to exchange the tool.

In the above-described aspect, passing of the tool may be performed between the hands of the adjacent robots.

The above-described aspect may further include a temporary table for the tool, between the adjacent robots, wherein passing of the tool may be performed such that the tool is placed on the temporary table with the hand of one of the adjacent robots and is picked up from the temporary table with the hand of the other robot.

In the above-described aspect, each of the robots may be provided with the hand and a machining tool for machining the work, in an exchangeable manner; and, when one of the robots needs to exchange the tool, the all of the other robots that are disposed between the robot that needs to exchange the tool and the tool storage unit may exchange the machining tools thereof for the hands thereof.

DESCRIPTION OF EMBODIMENT

A robot system 1 according to one embodiment of the present invention will be described below with reference to the drawings.

Figure 1:
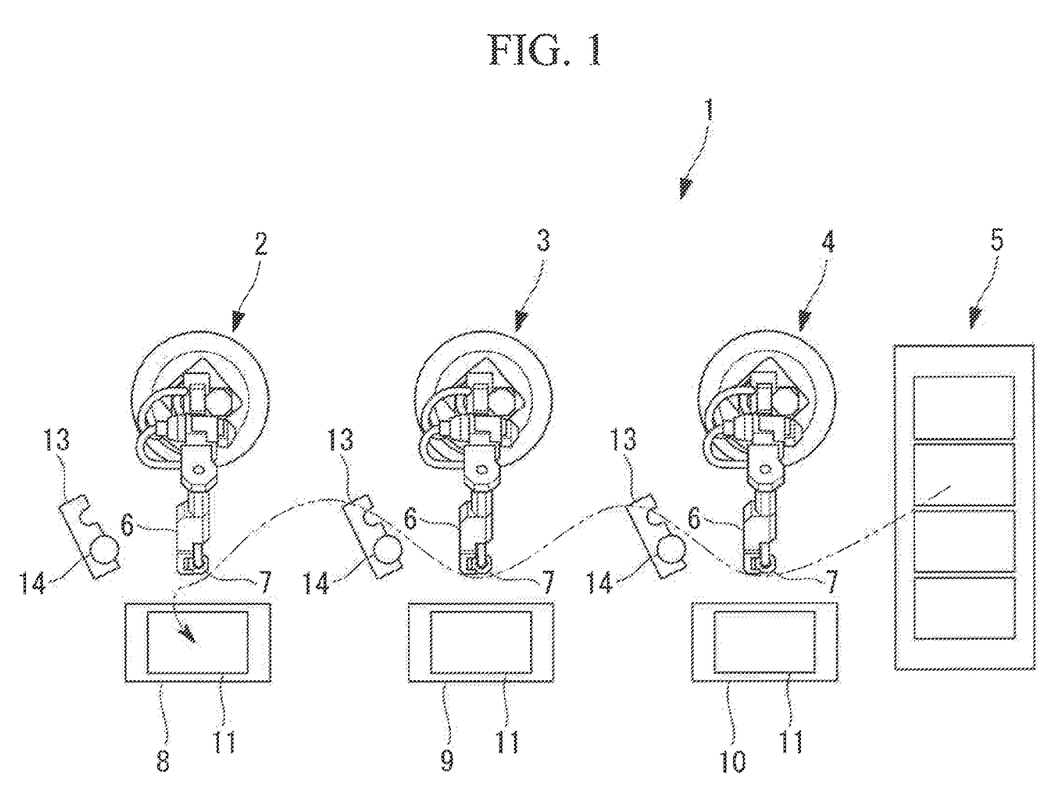
FIG. 1 is a view showing the overall configuration of a robot system according to one embodiment of the present invention.

As shown in FIG. 1, the robot system 1 of this embodiment is provided with: a plurality of robots 2, 3, and 4 each of which has a machining tool 7 attached thereto, to machine a work W; a tool storage unit 5 that is disposed in the vicinity of the robot 4; and a control unit (not shown) that controls the robots 2, 3, and 4.

Figure 2:
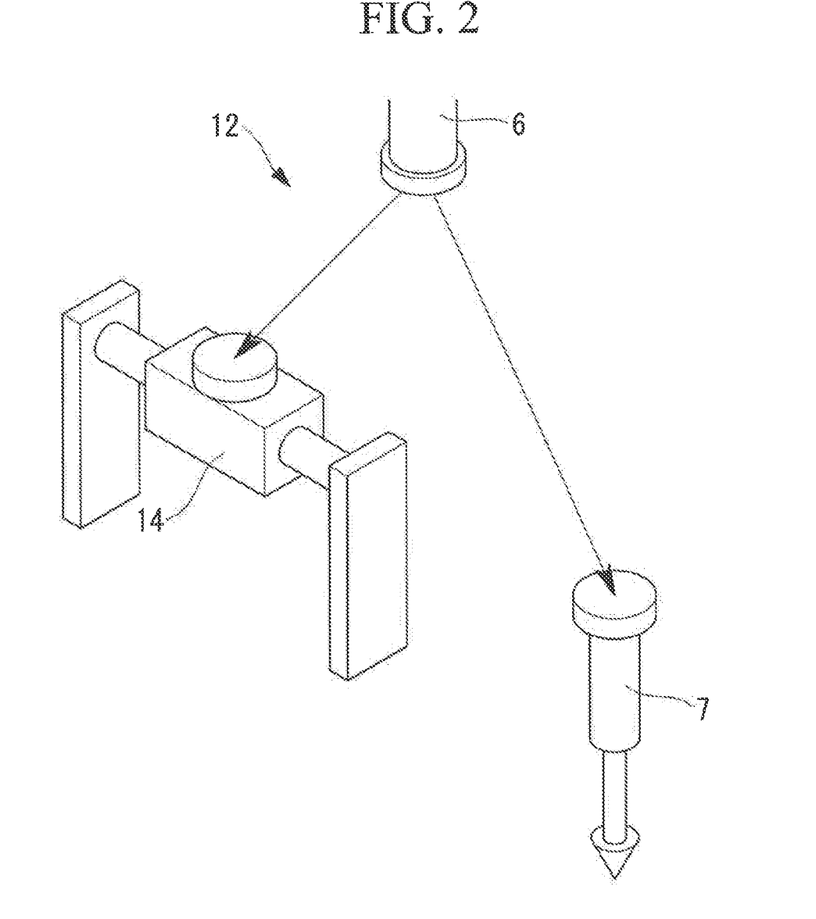
FIG. 2 is a perspective view showing an example of exchange of a hand and a machining tool performed by an AHC provided in each robot of the robot system shown in FIG. 1.

The robots 2, 3, and 4 are, for example, 6-axis articulated robots and apply, by using the machining tools 7 attached to the distal ends of arms 6 thereof, machining, such as deburring, to works W that are attached to work tables 8, 9, and 10 by means of jigs (tools) 11, the work tables 8, 9, and 10 being disposed at the positions corresponding to the robots 2, 3, and 4, respectively. As shown in FIG. 2, an automatic hand changer (AHC) 12 is attached to each of the robots 2, 3, and 4, so that the AHC 12 can exchange at the right moment: a hand 14 placed on a hand table 13 that is provided in the vicinity of each of the robots 2, 3, and 4; and the machining tool 7, which is used to machine the work W.

The tool storage unit 5 stores a plurality of types of jigs 11 for fixing the works W machined by the robots 2, 3, and 4, according to the types of the works W. The robot 4, which is disposed closest to the tool storage unit 5, can take out a jig 11 stored in the tool storage unit 5, with the hand 14 thereof.

Figure 3:
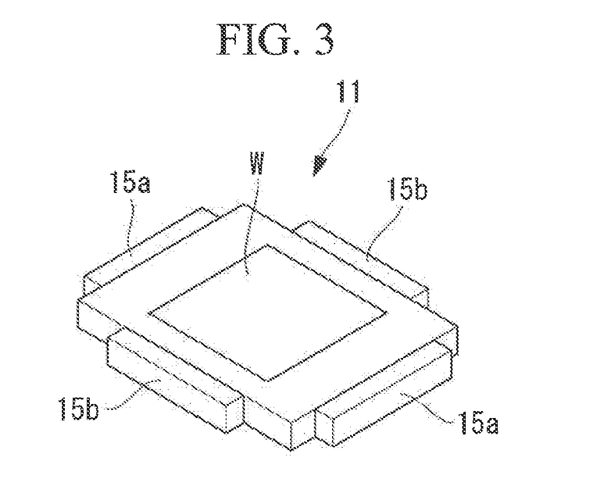
FIG. 3 is a perspective view showing a jig as an example tool to be conveyed in the robot system shown in FIG. 1.
Figure 4:
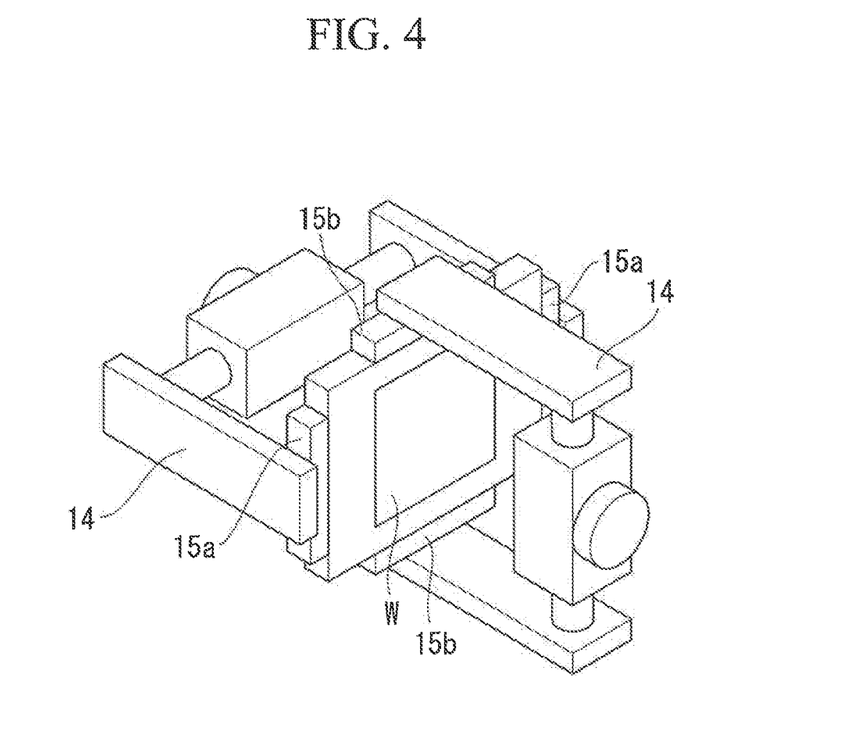
FIG. 4 is a perspective view showing a state in which the jig shown in FIG. 3 is grasped with the hands of two robots.

As shown in FIG. 3, every jig 11 stored in the tool storage unit 5 has, at two pairs of positions, grasped portions 15a and 15b that can be grasped with the hands 14. As shown in FIG. 4, the two pairs of grasped portions 15a and 15b are disposed at positions for allowing the grasped portions 15b to be grasped with the hand 14 of the robot 3 in a state in which the grasped portions 15a are grasped with the hand 14 of the robot 4. The shapes and the positions of the respective grasped portions 15a and 15b are made common; thus, the respective robots 2, 3, and 4 have just the hands 14 of a single type disposed in an attachable manner, thereby making it possible to grasp and handle every jig 11.

The control unit outputs a command signal to each of the robots 2, 3, and 4 in response to a command from a higher-order line controller. Specifically, when a command signal for changing the type of the work W of any of the robots 2, 3, and 4 is received from the higher-order line controller, the control unit outputs, to the robot 2 or 3 for which the type of the work W is to be changed (hereinafter, this robot is referred to as robot-of-interest), a command signal for removing the jig 11 from the corresponding work table 8, 9, or 10 and passing the jig 11 to the robot 3 or 4 adjacent thereto on the tool storage unit 5 side.

The control unit outputs, to all the robots 2, 3, and/or 4 that are/is disposed between the robot-of-interest 2 or 3 and the tool storage unit 5, a command signal for conveying the jig 11 removed by the robot-of-interest 2 or 3, to the tool storage unit 5. After receiving the command signal, each robot 2, 3, or 4 changes from the held machining tool 7 to the hand 14 for handling, by means of the AHC 12.

The operation of the thus-configured robot system 1 of this embodiment will be described below.

According to the robot system 1 of this embodiment, the respective robots 2, 3, and 4 hold, by means of the AHCs 12, the machining tools 7 used for performing deburring on the works W and are capable of performing deburring on the works W fixed, by means of the jigs 11, to the work tables 8, 9, and 10 corresponding to the robots 2, 3, and 4, respectively.

Figure 5:
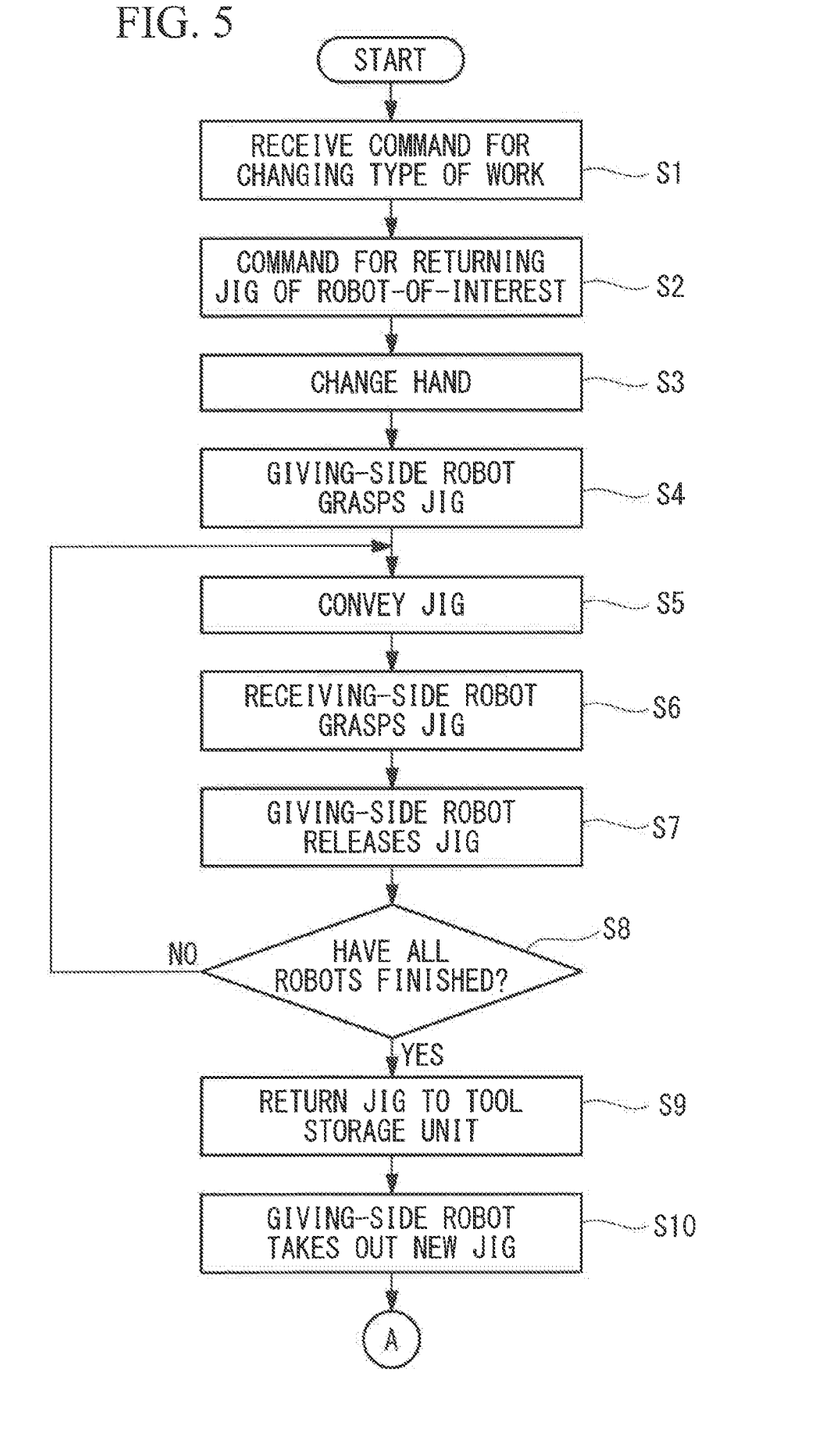
FIG. 5 is a flowchart for explaining the operation of the robot system shown in FIG. 1.

In this state, as shown in FIG. 5, when a command signal for changing the type of the work W to be machined by any of the robots 2, 3, and 4 is received from the higher-order line controller (Step S1), the control unit commands the robot-of-interest 2 or 3 to return the jig 11 (Step S2).

The robot-of-interest 2 or 3 that receives the command for returning the jig 11 and all the robots 3 and/or 4 that are/is disposed between the robot-of-interest 2 or 3 and the tool storage unit 5 change from the held machining tools 7 to the hands 14, which are used for handling the jig 11, by means of the AHCs 12 (Step S3).

The robot-of-interest (giving-side robot) 2 or 3 grasps, with the hand 14 attached thereto, the jig 11 (on the corresponding work table 8 or 9) by using the grasped portions 15a (Step S4) and conveys the jig 11 in the direction toward the robot (receiving-side robot) 3 or 4 adjacent thereto on the tool storage unit 5 side (Step S5).

The receiving-side robot 3 or 4, which is adjacent to the giving-side robot 2 or 3, grasps, with the hand 14 attached thereto, the grasped portions 15b of the jig 11 that is in a state in which the grasped portions 15a are grasped with the hand 14 of the giving-side robot 2 or 3 (Step S6). At the moment of completion of grasping of the grasped portions 15b performed by the receiving-side robot 3 or 4, grasping of the jig 11 performed by the giving-side robot 2 or 3 is released (Step S7). Accordingly, the jig 11 is passed from the giving-side robot 2 or 3 to the receiving-side robot 3 or 4.

Similarly, in a case in which a plurality of robots 2, 3, and 4 are disposed between the robot-of-interest 2 or 3 and the tool storage unit 5 (Step S8), the process from Step S5 is repeated while changing the grasped portions 15a and 15b to be grasped, thereby passing the jig 11 from the hand 14 to the hand 14 between the all adjacent robots 2, 3, and 4.

Figure 6:
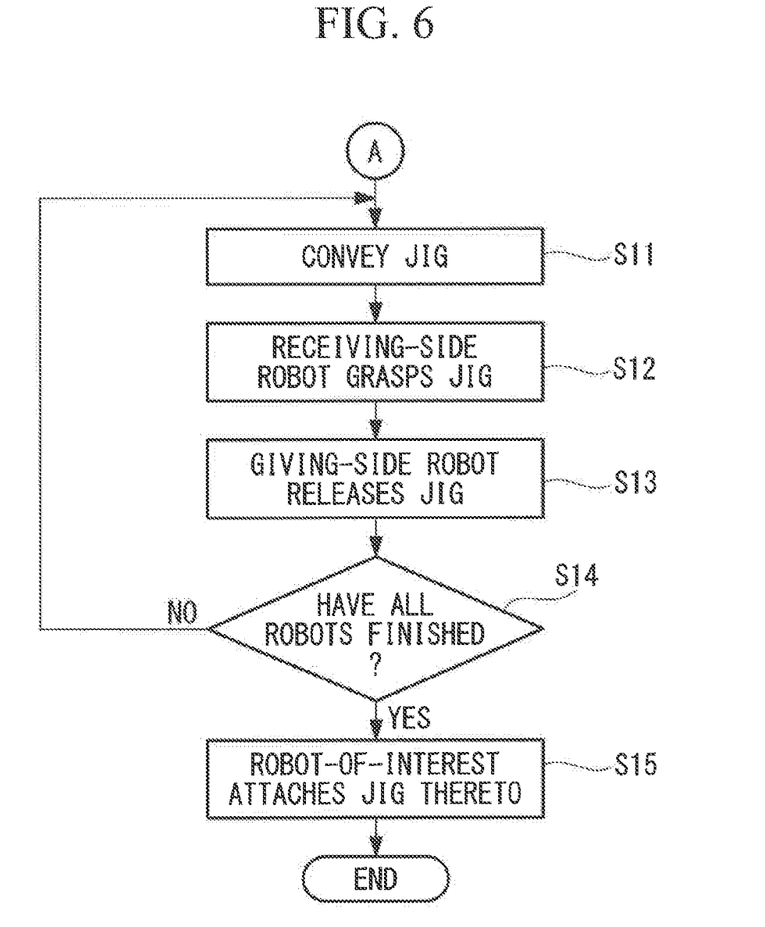
FIG. 6 is a flowchart for explaining the rest of the operation of the robot system shown in FIG. 5.

Then, after the jig 11 is passed to the robot 4, which is disposed closest to the tool storage unit 5, the robot 4 returns the grasped jig 11 to the tool storage unit 5 (Step S9) and takes out a jig 11 corresponding to a commanded new work W from the tool storage unit 5 (Step S10). Thereafter, as shown in FIG. 6, the jig 11 is passed from the hand 14 to the hand 14 between the robots 2, 3, and 4 in the reverse order with respect to the process from Step S5 to Step S8 (Step S11 to Step S14), and, when the jig 11 is passed to the robot-of-interest 2, 3, or 4, the jig 11 received by the robot-of-interest 2, 3, or 4 is mounted on the corresponding work table 8, 9, or 10 (Step S15).

Every robot 2, 3, or 4 that has completed passing of the jig 11 changes from the hand 14 to the machining tool 7 by means of the AHC 12, and thus, the respective robots 2, 3, and 4 restart deburring on the works W placed on the work tables 8, 9, and 10 corresponding to the robots 2, 3, and 4, respectively.

In this way, according to the robot system 1 of this embodiment, when there is a need to exchange the jig 11, which supports the work W, due to a change in the type of the work W to be machined or another reason, the jig 11 is passed between the adjacent robots 2, 3, and 4, thereby making it possible to convey the jig 11 stored in the tool storage unit 5, which is disposed at one place, to the robot-of-interest 2, 3, or 4, for which the jig 11 needs to be exchanged.

As a result, there is an advantage that it is possible to build a low-cost compact robot system that does not require large-scale equipment, such as a conveyance carriage, a traveling rail, etc.

Figure 7:
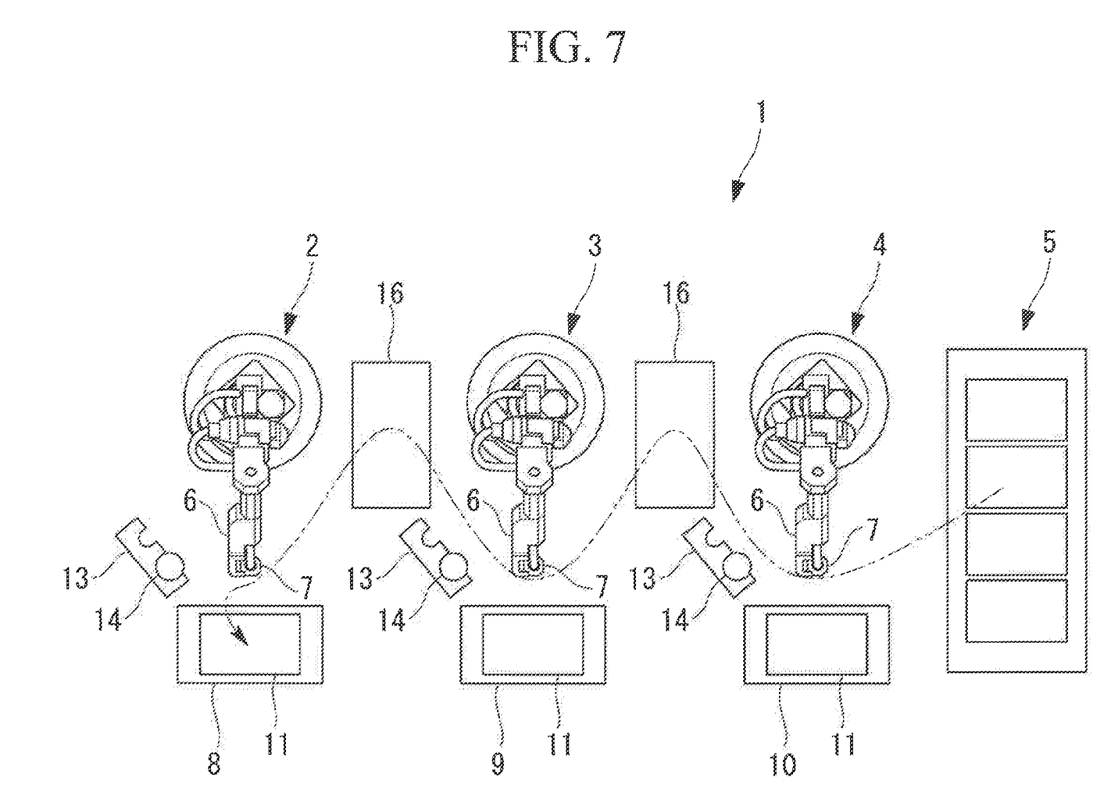
FIG. 7 is a view showing the overall configuration of a modification of the robot system shown in FIG. 1.

In this embodiment, although the adjacent robots 2, 3, and 4 pass the jig 11 from the hand 14 to the hand 14 by alternately grasping the two pairs of grasped portions 15a and 15b, which are provided on the jig 11, instead of this, only one pair of grasped portions 15a may be provided on the jig 11, and, as shown in FIG. 7, temporary tables 16 on which the jig 11 is temporarily placed may be provided between the adjacent robots 2, 3, and 4. By doing so, the coordinated operation between the robots 2, 3, and 4 is not required, and the receiving-side robot 2, 3, or 4 can easily grasp the jig 11 by using the grasped portions 15a of the jig 11 placed on the temporary table 16 by the giving-side robot 2, 3, or 4 in an orientation allowing it to be easily grasped.

Figure 8:
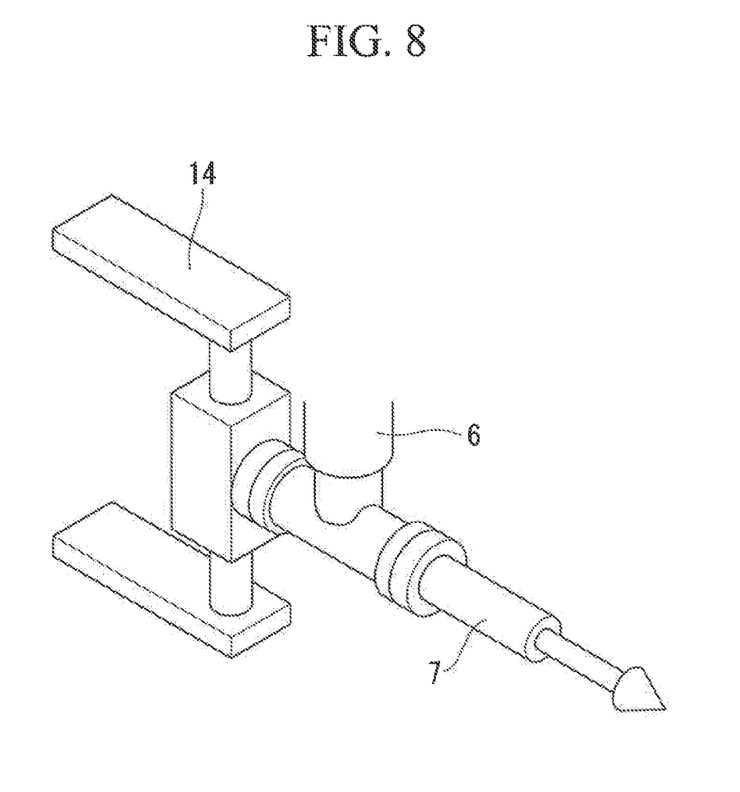
FIG. 8 is a perspective view showing another modification of the robot system shown in FIG. 1.

In this embodiment, although each of the robots 2, 3, and 4 has the AHC 12 attached thereto to hold the machining tool 7 or the hand 14 in an alternative manner and performs one of machining with the machining tool 7 and handling of the jig 11 with the hand 14, instead of this, as shown in FIG. 8, each of the robots 2, 3, and 4 may hold both the machining tool 7 and the hand 14 and use the machining tool 7 or the hand 14 while switching therebetween.

Although the jig 11 for fixing the work W has been illustrated as a tool to be grasped and conveyed by the robots 2, 3, and 4 with the hands 14, instead of this, the machining tools 7 for machining the works W may be conveyed between the single tool storage unit 5 and the robots 2, 3, and 4.

As a result, the following aspect is read from the above described embodiment of the present invention.

According to one aspect, the present invention provides a robot system including: a plurality of robots that are arranged at intervals and that each perform machining on a work; and a tool storage unit that stores a tool used when each of the robots performs machining on the work and that is disposed at a position allowing at least one of the robots to take out the tool, wherein the respective robots are provided with hands with which the tool stored in the tool storage unit can be handled; and, when one of the robots needs to exchange the tool, all of the other robots that are disposed between the robot that needs to exchange the tool and the tool storage unit pass the tool between the adjacent robots with the hands and convey the tool to the robot that needs to exchange the tool.

According to this aspect, when any robot, among the plurality of robots that each perform machining on a work, needs to exchange a tool used when the work is machined, the robot that is disposed at a position allowing it to take out a tool stored in the tool storage unit takes out the tool from the tool storage unit with the hand thereof and passes the tool to the robot adjacent thereto. The robot to which the tool is passed further passes, with the hand thereof, the tool to the robot that is adjacent thereto on the other side, to convey the tool to the robot that needs to exchange the tool. Accordingly, it is possible to build a low-cost compact robot system that does not require separate large-scale equipment for conveying a tool.

In the above-described aspect, passing of the tool may be performed between the hands of the adjacent robots.

By doing so, the tool is passed between the hands of the robots, thereby eliminating separate equipment for passing a tool and making it possible to build a more-compact robot system.

The above-described aspect may further include a temporary table for the tool, between the adjacent robots, wherein passing of the tool may be performed such that the tool is placed on the temporary table with the hand of one of the adjacent robots and is picked up from the temporary table with the hand of the other robot.

By doing so, the robot that takes out the tool with the hand thereof temporarily places the tool on the temporary table, thereby making it easy for the robot adjacent thereto to grasp the tool with the hand thereof and making it possible to efficiently convey the tool.

In the above-described aspect, each of the robots may be provided with the hand and a machining tool for machining the work, in an exchangeable manner; and, when one of the robots needs to exchange the tool, the all of the other robots that are disposed between the robot that needs to exchange the tool and the tool storage unit may exchange the machining tools thereof for the hands thereof.

By doing so, when each of the robots performs machining on the work by using the machining tool, and one of the robots needs to exchange the tool, all of the other robots disposed between the robot that needs to exchange the tool and the tool storage unit can exchange the machining tools thereof for the hands thereof to pass the tool.

REFERENCE SIGNS LIST 1 robot system
2, 3, 4 robot
5 tool storage unit
7 machining tool
11 jig (tool)
14 hand
16 temporary table
W work

The invention claimed is:

1. A robot system comprising:
    a plurality of robots that are arranged at intervals and that each perform machining on a work; and
    one tool storage that stores a plurality of types of specific tools for each type of work used for fixing the work according to the types of the work when each of the robots performs machining on the work, the one tool storage being disposed closest to one of the robots among the plurality of robots,
    wherein the respective robots are provided with hands with which the tool stored in the tool storage can be handled; and
    when one of the robots needs to exchange the tool, all of the other robots that are disposed between the robot that needs to exchange the tool and the tool storage pass the tool between the adjacent robots with the hands and convey the tool to the robot that needs to exchange the tool.

2. A robot system according to claim 1, wherein passing of the tool is performed between the hands of the adjacent robots.

3. A robot system according to claim 1, further comprising a temporary table for the tool, between the adjacent robots,
    wherein passing of the tool is performed such that the tool is placed on the temporary table with the hand of one of the adjacent robots and is picked up from the temporary table with the hand of the other robot.

4. A robot system according to claim 1,
    wherein each of the robots is provided with the hand and a machining tool adapted to machine the work, in an exchangeable manner; and
    when one of the robots needs to exchange the tool, all of the other robots that are disposed between the robot that needs to exchange the tool and the tool storage exchange the machining tools thereof for the hands thereof.

5. A robot system according to claim 1, wherein the tool comprises one pair of a first grasped portion and one pair of a second grasped portion.

6. A robot system according to claim 3, wherein the tool comprises one pair of a first grasped portion.

\* \* \* \* \*